US012724731B2

(12) United States Patent
Thatikonda et al.

(10) Patent No.: US 12,724,731 B2
(45) Date of Patent: Sep. 1, 2026

(54) ACCELERATED REPLICATION ON RECOVERY SITE IN HYBRID CLOUD ENVIRONMENT

(71) Applicant: INTERNATIONAL BUSINESS MACHINES CORPORATION, Armonk, NY (US)

(72) Inventors: Vamshikrishna Thatikonda, Hyderabad (IN); Venkata Naga Seshaiah Anumula, Hyderabad (IN); Savitri Hunasheekatti, Bangalore (IN); Sanket Rathi, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 18/608,033

(22) Filed: Mar. 18, 2024

(65) Prior Publication Data

US 2025/0291749 A1 Sep. 18, 2025

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC ........................... G06F 3/0647; G06F 11/2007
See application file for complete search history.

(56) References Cited

U.S. PATENT DOCUMENTS 10,191,677 B1 1/2019 Natanzon et al.
11,392,617 B2 7/2022 Puvvada et al.
2003/0115411 A1* 6/2003 McBrearty .............. G06F 3/067 711/114
2006/0015946 A1* 1/2006 Yagawa .................. G06F 21/80 726/32
2006/0020753 A1* 1/2006 Cochran ............. G06F 11/2087 711/114
2013/0007504 A1* 1/2013 Bodke ................ G06F 11/2007 714/4.2
2013/0339647 A1* 12/2013 Jindo .................... G06F 3/0647 711/E12.103
2021/0303594 A1 9/2021 Puvvada et al.

OTHER PUBLICATIONS

Anonymous, "Disaster Recovery Rollback Support Using Clustered File System Snapshot and Clone Technology in Hypervisor-Based Replication", https://ip.com/IPCOM/000268720, Feb. 21, 2022, 6 pages.

Anonymous, "Method to improve GLVM asynchronous mirroring performance by leveraging server side caching", https://ip.com/IPCOM/000262594, Jun. 13, 2020, 6 pages.

Anonymous, "Method to Maintain Consistent Data on Recovery Site in Hybrid Cloud Environment", https://ip.com/IPCOM/000268314, Jan. 23, 2022, 6 pages.

* cited by examiner

*Primary Examiner* — Getente A Yimer
(74) *Attorney, Agent, or Firm* — Seed Intellectual Property Law Group LLP

(57) ABSTRACT

A computer-implemented method may include receiving an alert indicating a need for accelerated I/O group mirroring; creating a shadow physical volume of an emulated physical volume present on an RPV server; communicating a capability of the RPV server to mirror I/O groups in parallel; mirroring the I/O groups to the shadow physical volume and the emulated physical volume present on the RPV server; receiving a merge command; and merging the shadow physical volume and the emulated physical volume.

18 Claims, 4 Drawing Sheets

ACCELERATED REPLICATION ON RECOVERY SITE IN HYBRID CLOUD ENVIRONMENT

BACKGROUND

Aspects of the present invention relate generally to data mirroring. Hybrid cloud environments may be used for disaster recovery (DR) of data, including storing data in cloud-based storage while applications continue to run in distinct, on-premises environments. In case of an on-premises disaster, a user generally prefers to quickly continue their applications from the cloud environment. The primary requirement for such a use case would be to have data replicated in the cloud. Geographic logical volume managers (GLVM), including remote physical volume (RPV) clients and RPV servers, can facilitate the storage data replication to a backup site from an on-premises environment.

A GLVM provides a network-based mirroring method in a computing environment. The GLVM may mirror any data destined for nodes at a local site, e.g., a production site, across an internet-based network to nodes at a remote site, e.g., a backup site. A total hardware failure, e.g., a CPU, disk, network, or power failure including disasters, of a GLVM node at the local site does not cause the loss of data on the GLVM node at the remote site.

SUMMARY

In a first aspect of the invention, there is a computer-implemented method including: receiving an alert indicating a need for accelerated I/O group mirroring; creating a shadow physical volume of an emulated physical volume present on an RPV server; communicating a capability of the RPV server to mirror I/O groups in parallel; mirroring the I/O groups to the shadow physical volume and the emulated physical volume present on the RPV server; receiving a merge command; and merging the shadow physical volume and the emulated physical volume.

In another aspect of the invention, there is a computer program product including one or more computer readable storage media having program instructions collectively stored on the one or more computer readable storage media. The program instructions are executable to: receive an alert indicating a need for accelerated I/O group mirroring; create a shadow physical volume of an emulated physical volume present on an RPV server; communicate a capability of the RPV server to mirror I/O groups in parallel; mirror the I/O groups to the shadow physical volume and the emulated physical volume present on the RPV server; receive a merge command; and merge the shadow physical volume and the emulated physical volume.

In another aspect of the invention, there is a system including a processor set, one or more computer readable storage media, and program instructions collectively stored on the one or more computer readable storage media. The program instructions are executable to: receive an alert indicating a need for accelerated I/O group mirroring; create a shadow physical volume of an emulated physical volume present on an RPV server; communicate a capability of the RPV server to mirror I/O groups in parallel; mirror the I/O groups to the shadow physical volume and the emulated physical volume present on the RPV server; receive a merge command; and merge the shadow physical volume and the emulated physical volume.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
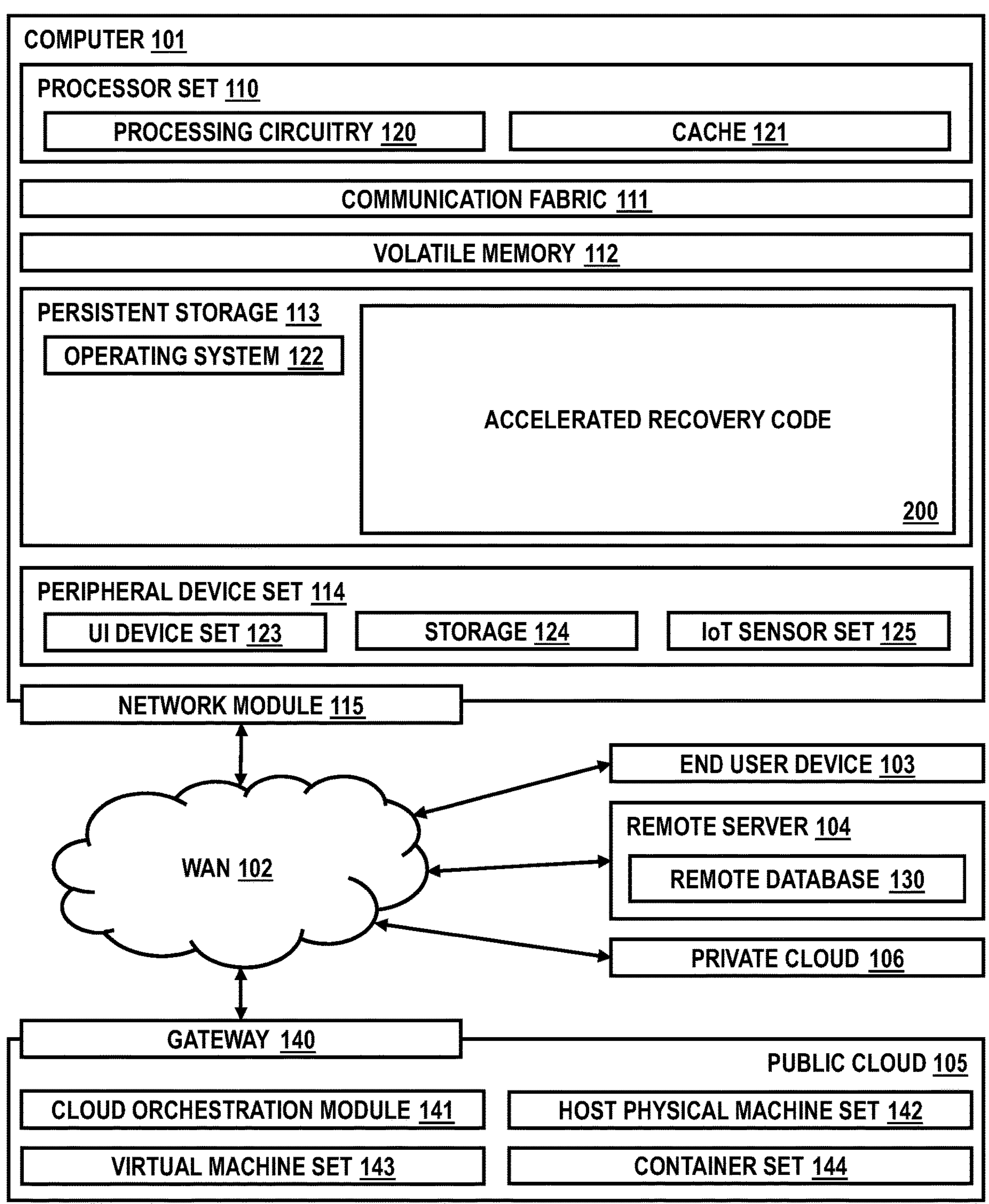
FIG. 1 depicts a computing environment according to an embodiment of the present invention.

Aspects of the present invention relate generally to data mirroring and, more particularly, to data mirroring for disaster recovery purposes. According to aspects of the invention, a system may split an outstanding number of I/O groups (data groups) to be flushed to a remote site node into two or more sets and, on the remote site node, create the same number of exact logical copies of emulated physical volumes from which the I/O groups originated. In embodiments, the system may accelerate the application of I/O groups while still maintaining the order of I/Os in each set. The system may copy each physical volume to an emulated physical volume and a shadow physical volume in a parallel manner. The system may merge the emulated physical volumes and the shadow physical volume upon receiving a merge request from a client node. In this manner, implementations of the invention merge I/O groups on the remote side in the order in which the I/O groups were split on the client side.

A typical GLVM environment creates a volume group that includes mirror copies of data on remote site storage. A volume group is carved out into logical partitions and logical volumes are carved out using the logical partitions. Applications such as file systems store and maintain their data on these logical volumes. An RPV client driver coordinates with an RPV server driver to copy the data in the volume group to mirror copies present on the remote site node.

GLVM may support two types of mirroring, synchronous and asynchronous. In synchronous mirroring, data written by applications are written to disks at two (local and remote) sites before returning an indication of success to the application. Asynchronous mirroring employs a cache at the local site node, and instructions from applications are written to the local site disk and cache at the local site node, and success is returned to the application. A background thread will flush the data from the cache at the local node to a remote node disk. The cache in asynchronous mirroring is generally a portion of the disks at a local site used for capturing the writes to the local site disk. These writes will be replicated at the remote site disk upon flushing the cache.

Asynchronous mirroring logic, which may be part of the RPV client driver at the local site, organizes incoming data into I/O groups where each I/O group consists of some number of I/Os and the I/O groups are written to the RPV server on the remote site node in the order in which the I/O groups are formed originally at the local site. I/O groups are communicated through a single channel in a specific write order. Maintaining the order in which the I/O groups are formed ensures that the data on the remote site is point-in-time consistent. In a disaster, such as a total hardware failure, e.g., a CPU, disk, network, or power failure, there may still be some pending I/O groups at the local site cache to get mirrored to the remote recovery site, and data on the remote site node is still meaningful to the application.

Since on-premises writes by the application are considered a success when they write data to both the local disk as well as a cache, it is advantageous to appropriately size the cache device based on the incoming I/O group pressure by the workload as well as the speed at which the flush to the remote site occurs. However, an RPV server will have to apply I/O groups in series and not in parallel to maintain data consistency on the remote site. This may become a bottleneck for the speed at which the replication happens and also for freeing the space in the cache. The sooner the RPV server drives the I/O groups to the remote site node, the faster the replication completes and space in the cache is freed. There may also be use cases to flush the cache sooner. For example, network latencies in a public cloud environment may create practical limitations on achieving a higher speed i.e., latency bottlenecks still exist as the data passes through public infrastructure. There is a need for acceleration of mirroring I/O groups to the disks on to a remote site node.

As a non-limiting example acceleration of mirroring I/O groups to the disks on to a remote site node, a number of outstanding I/O groups in an asynchronous cache may be split into four sets, each set consisting of a similar size i.e., bytes. A remote node may create four logical copies of the physical volumes involved, including an original copy. Virtual I/O servers (VIOS) may create files in a distributed file system and virtualize or emulate them as disks to the virtual machines present on a server. An RPV server may have visibility of four different sets of physical volumes. An RPV client may parallelly replicate each of the four sets of outstanding I/O groups in the same order as the corresponding physical volume. The RPV client may communicate a merge request to the RPV server and the merge request may be processed by a VIOS. The VIOS functions as a distributed filesystem capable of creating virtual I/O server point-in-time snapshots for files and is capable of providing change blocks from each of the created snapshots, i.e., identifying the differences between point-in-time snapshots. The VIOS may process the merge request and merge all of the four sets of outstanding I/O groups to the corresponding physical volume. In this way, I/O groups may be formed into a single database. This may include adding new data to existing data, amending data, or removing data.

In embodiments, the system operates in a GLVM environment in which remote site nodes, i.e., VM (Virtual Machines), will always have the virtualized volumes coming through virtual small computer systems interfaces (VSCSI). A VIOS may act as a storage target for virtual machines. VMs may interact with VIOS through standard small computer systems interfaces (SCSI) protocol. Virtualized volumes may have snapshot and cloning capabilities on a VIOS. Virtualized volumes may be observed as remote physical volumes on the RPV client.

In embodiments, a computer implemented method for replication on recovery in hybrid cloud environment may include splitting an outstanding number of I/O groups in asynchronous cache into two or more sets; mirroring, in parallel, the sets of the I/O groups with flags having information identifying the sets (from the original physical volumes in the cache to the shadow physical volumes in remote site node) to make replicas of the sets of the I/O groups in the remote site node using snapshot/clone technology; and providing a merge command to the remote site node so that the replicas of the sets of the I/O groups are merged in a correct order using the flags.

Implementations of the disclosed system provide a technical improvement to the field of data mirroring by reducing latency bottlenecking when applying I/O groups in parallel to maintain data consistency on the remote site rather than in series in order to increase the speed at which the replication happens. Implementations of the disclosed system also expedite replication by freeing space within an asynchronous cache sooner than if replication occurred in series.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the accelerated recovery code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
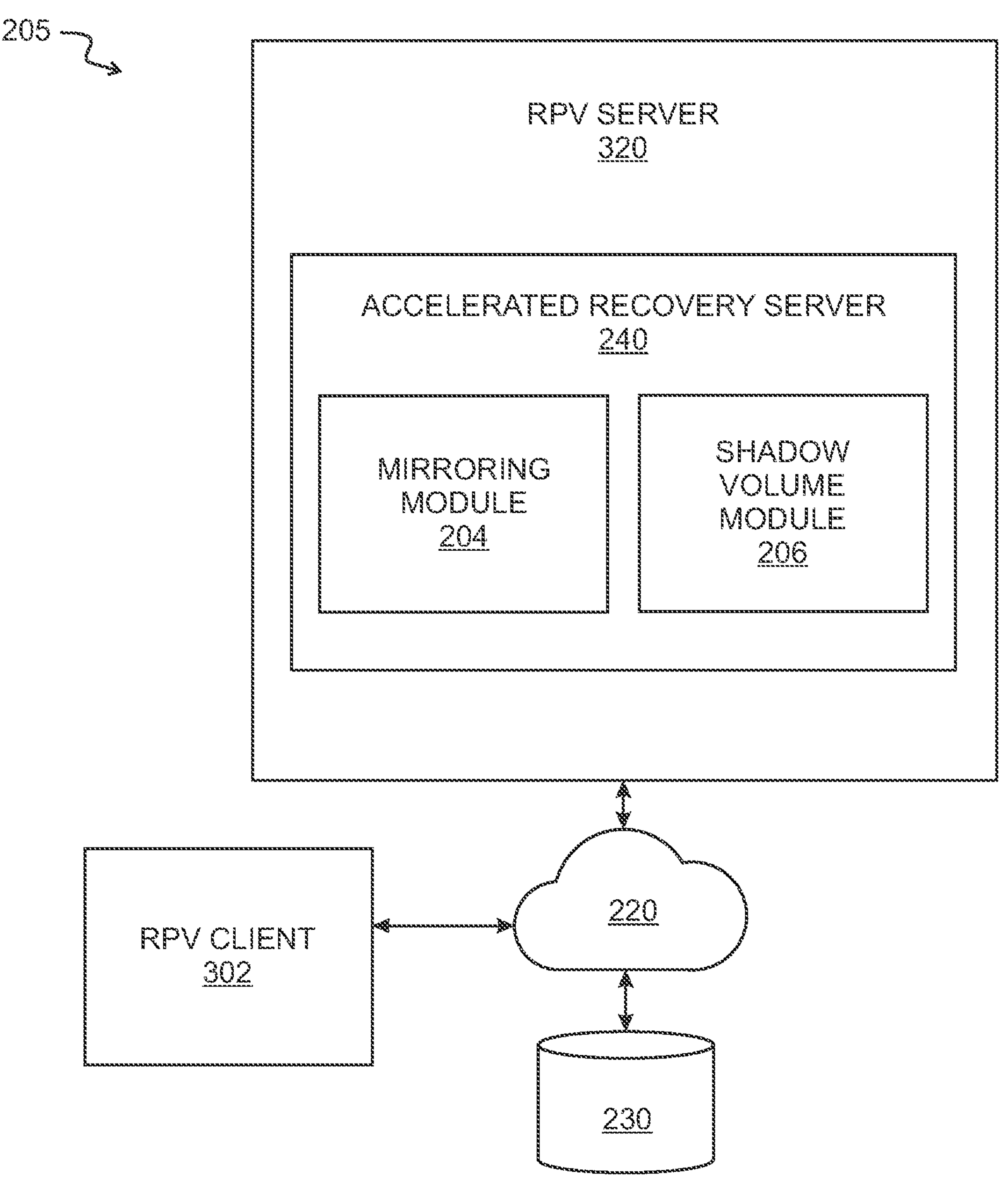
FIG. 2 shows a block diagram of an exemplary environment in accordance with aspects of the present invention.

FIG. 2 shows a block diagram of an exemplary environment 205 in accordance with aspects of the invention. In embodiments, the environment includes an RPV server 320 and an accelerated recovery server 240 corresponding to computer 101 of FIG. 1. The accelerated recovery server 240 may include the accelerated recovery code of block 200 of FIG. 1. The accelerated recovery server 240 may include a mirroring module 204 and a shadow volume module 206. The accelerated recovery server 240 may be in operable communication, over WAN 220 corresponding to WAN 102 of FIG. 1, with database 230 corresponding to remote server 104 and remote database 130 of FIG. 1.

The mirroring module 204 may be configured to split or form I/O groups into fixed sets stored in an asynchronous cache. An RPV client 302 may read the fixed sets from the I/O groups and may communicate I/O group data in parallel to an RPV server 320 via the mirroring module 204. The RPV client 302 may receive information that the asynchronous cache occupancy is nearing or has reached a hi-threshold percentage, such as by monitoring the storage capacity of the asynchronous cache via the RPV client 320. The RPV client 302 may query the RPV server's 320 capability to mirror I/O groups in parallel. Mirroring module 204 may mirror an I/O group from the asynchronous cache of the RPV client 302 to the RPV server 320. In this way, the RPV client 302 may parallelly replicate each of the fixed sets of I/O groups to a shadow physical volume on the RPV server 320 in the same order as the corresponding physical volume.

The shadow volume module 206 may be configured to create the shadow physical volume of a physical volume present on the RPV server and may copy each physical volume to a shadow physical volume in a parallel manner. The shadow volume module 206 may be configured to merge emulated physical volumes and shadow physical volumes upon receiving a merge request from the RPV client.

In embodiments, the accelerated recovery server 240 of FIG. 2 comprises mirroring module 204 and a shadow volume module 206, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The accelerated recovery server 240 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Figure 3:
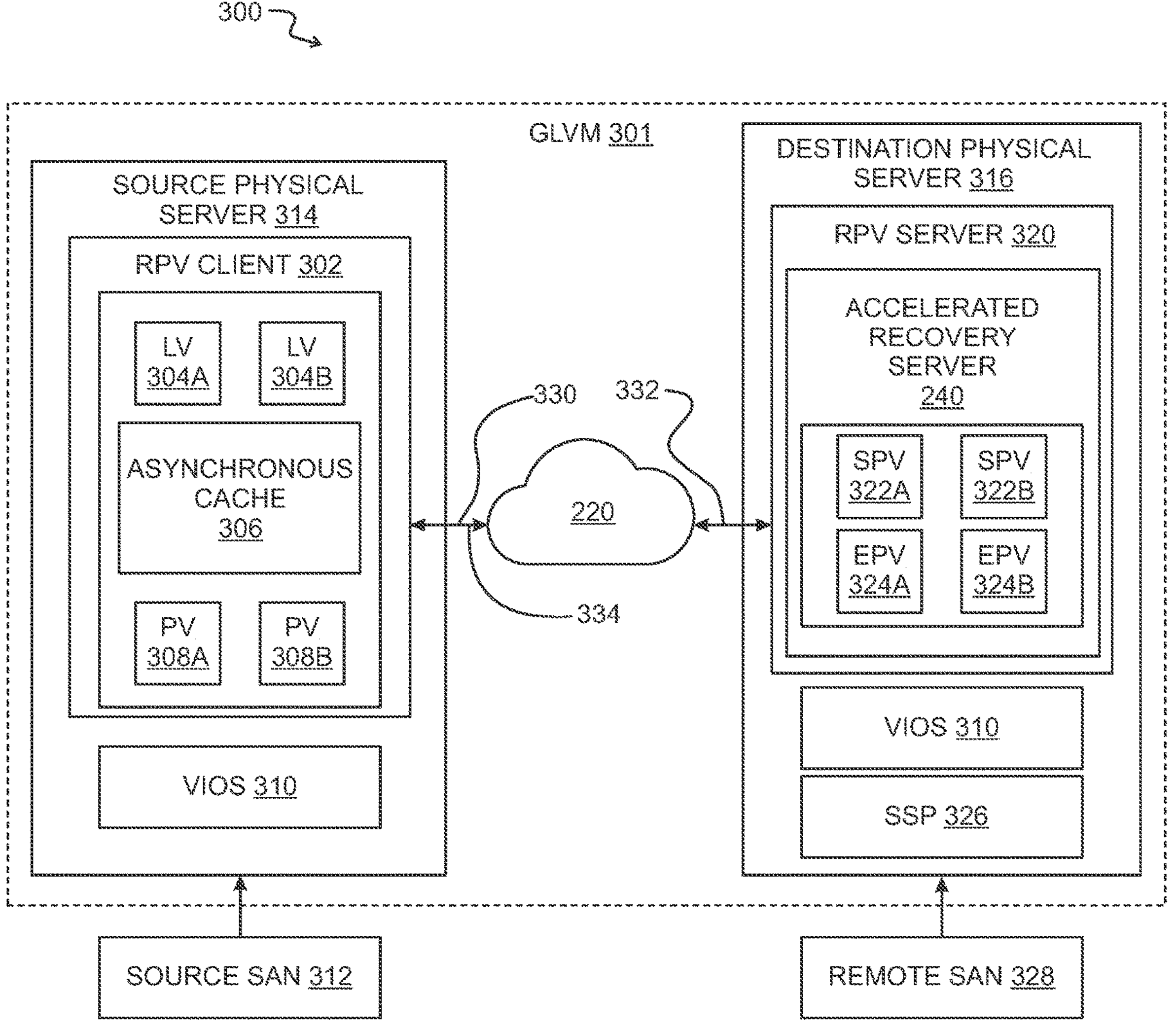
FIG. 3 shows a block diagram of an exemplary system in accordance with aspects of the present invention.

FIG. 3 shows a block diagram of an exemplary system 300 in accordance with aspects of the present invention. The system 300 may perform the steps of a method that may be carried out in the environment of FIG. 2 and are described with reference to elements depicted in FIG. 1 and FIG. 2.

In embodiments, the system 300 may include a GLVM 301 including a source physical server 314 in operable communication with a destination physical server 316 over WAN 220 corresponding to WAN 220 of FIG. 2 and WAN 102 of FIG. 1. Source physical server 314 may be a local site, e.g., a production site, communicating across WAN 220 to nodes at the destination physical server 316 which may be a remote site, e.g., a backup site. In embodiments, source physical server 314 is in operable communication with a source storage area network (SAN) 312. The source physical server 314 may include an RPV client 302. The destination server 316 may include an RPV server 320. The source physical server 314 may include an RPV client 302, which may also be referred to as a GLVM client. Similarly, the destination physical server 316 may include an RPV server 320 which may also be referred to as a GLVM server. In embodiments, destination physical server 316 is in operable communication with a remote SAN 328.

The RPV client 302 may split I/O groups into fixed sets, such as based on data size, via grouping module 202 of FIG. 2. I/O groups may be stored in asynchronous cache 306 having logical volumes (LV) 304A and 304B stored on local physical volumes (PV) 308A and 308B. The RPV client 302 may read the I/O groups from individual fixed sets and may communicate I/O group data in parallel to RPV server 320 i.e., over WAN 220. In this way, I/O groups may be mirrored to the RPV server 320. In some instances, while mirroring the I/O groups from the asynchronous cache 306 to the RPV server 320, the RPV server 320 may simultaneously receive information from the RPV client 302 that the asynchronous cache 306 occupancy is nearing or has reached a hi-threshold percentage, such as by monitoring the storage capacity of the asynchronous cache 306 via the RPV client 302. The RPV client 302 may communicate an alert 330 to the RPM server 320 of a need for an acceleration of I/O group processing in the event of the asynchronous cache 306 occupancy nearing or reaching a hi-threshold percentage. Upon receiving the alert 330, the RPV server 320 may create logical copies of the emulated physical volumes (EPV) 324A, 324B as shadow physical volumes (SPV) 322A, 322B present on the RPV server 320. The EPVs 324A, 324B may be emulations of PVs 308A, 308B of the RPV client 302 i.e. EPVs 324A, 324B may be virtual simulations of PVs 308A, 308B. The SPVs 322A, 322B may be allocated file structures to receive mirrored I/O groups. In response, the RPV client may query 332 the RPV server's 320 capabilities, including the number of I/O group sets that the RPV server 320 is capable of processing in parallel. The RPV client 302 may mirror I/O group data from a number of parallel sets with corresponding flags to emulated physical volumes 322A and 322B of the RPV server 320. Flags may assist the RPV server 320 in identifying an I/O set by providing identifying information. Once the mirroring of I/O group data from a number of parallel sets to the RPV server 320 is complete, the RPV client 302 may communicate a merge command 334 to the RPV server 320. RPV server 320 may merge the shadow physical volumes 322A, 322B to the emulated physical volumes 324A, 324B. Upon successful merging of shadow physical volumes 322A, 322B to the emulated physical volumes 324A, 324B, RPV client 302 will no longer perform I/O group processing until another alert 330 to the RPM server 320 is communicated of a need for an acceleration of I/O group processing.

The RPV server 320, upon receiving the alert 330 from the RPV client 302, interacts with VIOS 310 to create logical copies of the physical volumes 308A, 308B present on the RPV server. The logical copies may be shadow physical volumes 322A, 322B corresponding to the emulated physical volumes 324A, 324B 308A, 308B. The RPV server 320 may leverage a vendor specific command in small computer system interface (SCSI) protocol to instruct the VIOS 310 to create shadow physical volumes 322A, 322B. RPV server 320 may then configure the shadow physical volumes 322A, 322B for running the I/O based on hardware and operating system resources, including estimating number of I/O group sets that the RPV server 320 is capable of processing in parallel. The RPV server 320 responds to the RPV client 320 with how much parallel mirroring it can support, including the number of logical copies, in the form of shadow physical volumes 322A, 322B, that have been created. Parallel mirroring may also be user tunable. During I/O group processing by the RPV server 320, the RPV server 320 detects I/O group set info based on the flags. The RPV server 320 may write the I/O group data to the corresponding shadow physical volumes 322A, 322B in addition to the regular I/O group mirroring to the emulated physical volumes 324A, 324B. Upon receiving the merge command 334 from RPV client 302, RPV server 320 will send another vendor specific command to VIOS 310 to merge the shadow physical volumes 322A, 322B to the emulated physical volumes 324A, 324B. The merge command 334 explicitly specifies the order in which the shadow physical volumes 324A, 324B need to be merged. On receiving the merge command 334, RPV server 320 instructs the VIOS 310 to delete the shadow physical volumes 324A, 324B and continue with the regular I/O processing on the emulated physical volumes 324A, 324B.

VIOS 310 creates a consistency group for all the emulated physical volumes 324A, 324B when a merge command 334 is communicated to the RPV server 320. The consistency group(s) function as a point-in-time snapshot of the emulated physical volumes 324A, 324B. A shared storage pool (SSP) 326 may be a distributed file system capable of creating snapshots, consistency groups, or rollbacks. In embodiments, emulated physical volumes 324A, 324B may be created within the SSP 326. Data stored on these emulated physical volumes 324A and 324B may be restored to this point-in-time snapshot image in case of merge failures. After a successful merge, the VIOS creates a latest individual snapshot for each of the shadow physical volumes 324A, 324B. Additionally, the VIOS may obtain the difference between an original snapshot to the most recent snapshot for each of the shadow physical volumes 324A, 324B. In this way, blocks of data differing between snapshots may be identified. Differing blocks from each of the physical volumes 308A, 308B are read and written back to corresponding emulated physical volumes 324A, 324B. A merge may be completed once physical volumes 308A, 308B are mirrored to the emulated physical volumes 324A, 324B and shadow physical volumes 324A, 324B. In the event that a merge fails while writing on any of the emulated physical volumes 324A, 324B, the system may restore all of the emulated physical volumes 324A, 324B to the created consistency group.

Figure 4:
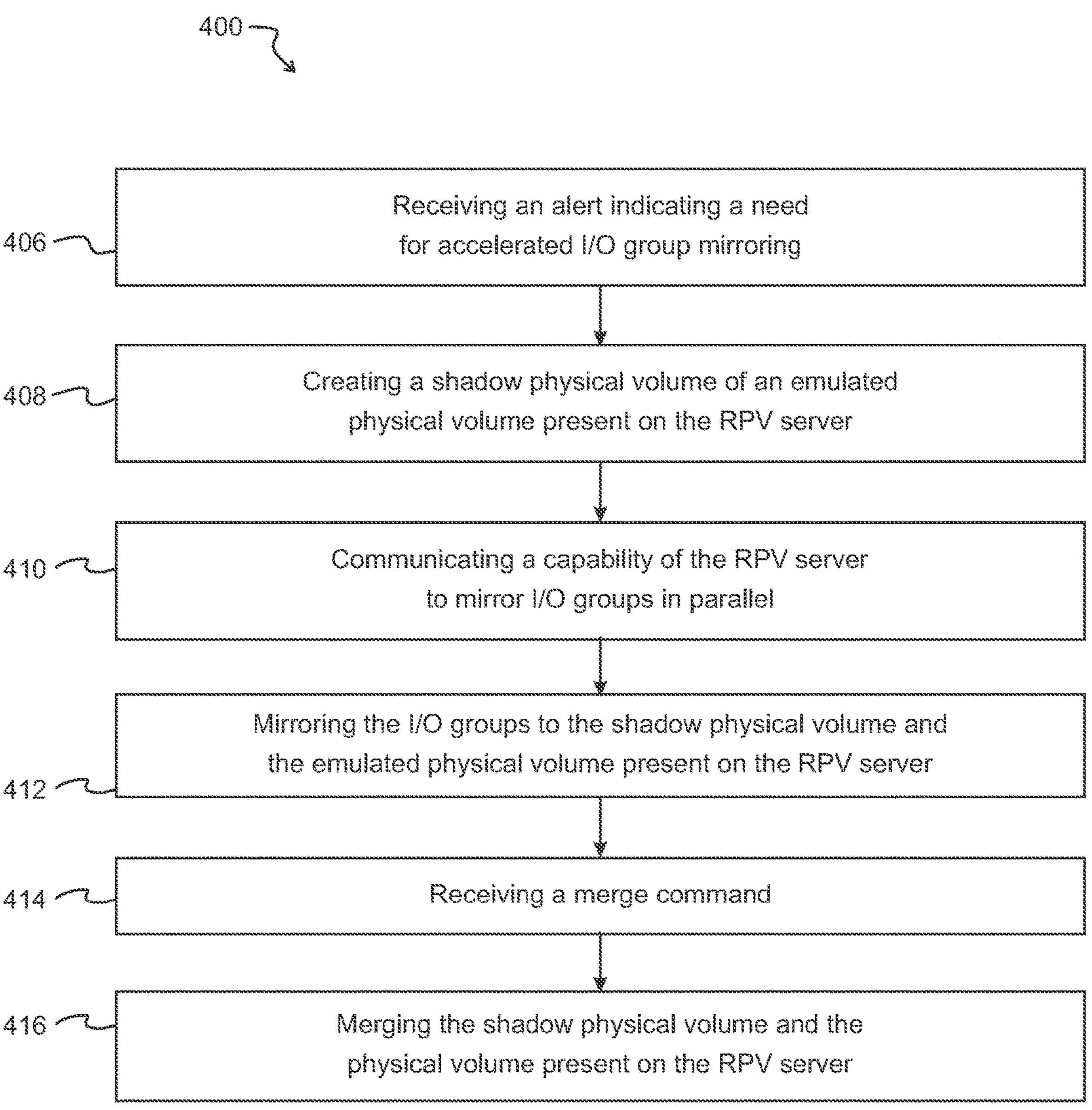
FIG. 4 shows a flowchart of an exemplary method in accordance with aspects of the present invention.

FIG. 4 shows a flowchart of an exemplary method 400 including step 404 that may include receiving an alert via the mirroring module 204, the alert indicating a need for accelerated I/O group mirroring via the mirroring module 204 of FIG. 2. Step 408 may include creating a shadow physical volume of a physical volume present on the RPV server via the shadow volume module 206 of FIG. 2. Step 410 may include communicating a capability of the RPV server to mirror I/O groups in parallel via the mirroring module 204 of FIG. 2, such as by communicating the number of I/O groups that may be mirrored to the RPV server. Step 412 may include mirroring the I/O groups to the shadow physical volume via the shadow volume module 206 of FIG. 2, such as by parallelly replicating each of the fixed sets of I/O groups to the shadow physical volume in the same order as the corresponding physical volume. The RPV client may read the I/O groups from individual fixed sets and may communicate I/O group data in parallel to an RPV server. Step 414 may include receiving a merge command at the RPV server via the mirroring module 204 of FIG. 2. Step 416 may include merging the shadow physical volume and the emulated physical volume present on the RPV server via the shadow volume module 206 of FIG. 2.

In embodiments, a service provider could offer to perform the processes described herein. In this case, the service provider can create, maintain, deploy, support, etc., the computer infrastructure that performs the process steps in accordance with aspects of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, implementations provide a computer-implemented method, via a network. In this case, a computer infrastructure, such as computer 101 of FIG. 1, can be provided and one or more systems for performing the processes in accordance with aspects of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes in accordance with aspects of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by a processor set, an alert indicating a need for accelerated mirroring of a set of I/O groups, the alert indicating occupancy of a cache associated with a client has reached a threshold;

responsive to receiving the alert, creating, by the processor set, a shadow physical volume of an emulated physical volume present on a remote physical volume (RPV) server, the shadow physical volume configured to store a replica of the set of I/O groups;

communicating, by the processor set, a capability of the RPV server to mirror the set of I/O groups in parallel, the capability including an indication of a number of I/O group sets the RPV server can process in parallel;

mirroring, by the processor set, the set of I/O groups to the shadow physical volume and the emulated physical volume present on the RPV server;

receiving, by the processor set, a merge command; and responsive to receiving the merge command, merging, by the processor set, the shadow physical volume and the emulated physical volume.

2. The computer-implemented method of claim 1, further comprising deleting the shadow physical volume from the RPV server.

3. The computer-implemented method of claim 1, further comprising creating a point-in-time snapshot of the emulated physical volume.

4. The computer-implemented method of claim 3, further comprising restoring data stored on a physical volume to the point-in-time snapshot of the emulated physical volume.

5. The computer-implemented method of claim 4, wherein the point-in-time snapshot comprises change blocks identifying a difference between a first point-in-time snapshot and a second point-in-time snapshot.

6. The computer-implemented method of claim 3, wherein the shadow physical volume is an exact logical replica of a physical volume.

7. The computer-implemented method of claim 1, further comprising separating the I/O groups into I/O subsets comprising assigning a flag to each I/O subset identifying the I/O subset.

8. The computer-implemented method of claim 1, wherein the mirroring occurs in an order in which the I/O groups were formed.

9. The computer-implemented method of claim 1, wherein the mirroring is asynchronous.

10. A computer program product comprising one or more non-transitory computer readable storage media having program instructions collectively stored on the one or more non-transitory computer readable storage media, the program instructions executable to:

receive an alert indicating a need for accelerated mirroring of a set of I/O groups, the alert indicates that an occupancy of a cache associated with a client has reached a threshold;

in response to receiving the alert, create a shadow physical volume of an emulated physical volume present on a remote physical volume (RPV) server, the shadow physical volume configured to store a replica of the set of I/O groups;

communicate a capability of the RPV server to mirror the set of I/O groups in parallel, the capability includes an indication of a number of I/O group sets the RPV server can process in parallel;

mirror the set of I/O groups to the shadow physical volume and the emulated physical volume present on the RPV server;

receive a merge command; and in response to receiving the merge command, merge the shadow physical volume and the emulated physical volume.

11. The computer program product of claim 10, wherein the program instructions are executable to: delete the shadow physical volume from the RPV server.

12. The computer program product of claim 10, wherein the program instructions are executable to: create a point-in-time snapshot of the emulated physical volume.

13. The computer program product of claim 12, wherein the program instructions are executable to: restore data stored on a physical volume to the point-in-time snapshot of the emulated physical volume.

14. The computer program product of claim 13, wherein the point-in-time snapshot comprises change blocks identifying a difference between a first point-in-time snapshot and a second point-in-time snapshot.

15. The computer program product of claim 12, wherein the shadow physical volume is an exact logical replica of a physical volume.

16. The computer program product of claim 10, wherein the program instructions are executable to: separate, based on data size, the I/O groups into I/O subsets comprising assigning a flag to each I/O subset identifying the I/O subset.

17. The computer program product of claim 10, wherein the mirroring occurs in an order in which the I/O groups were formed.

18. A system comprising:

a processor set, one or more non-transitory computer readable storage media, and program instructions collectively stored on the one or more non-transitory computer readable storage media, the program instructions executable to:

monitor a storage capacity of an asynchronous cache in a client server storing a set of I/O groups;

determine, based on the storage capacity of the asynchronous cache reaching a predetermined threshold, a need for accelerated mirroring of the set of I/O groups;

receive an alert indicating the need for accelerated mirroring of the set of I/O groups;

create, by leveraging a vendor specific command in small computer system interface (SCSI) protocol, a shadow physical volume of an emulated physical volume present on a remote physical volume (RPV) server, the shadow physical volume having file structures allocated to store a replica of the set of I/O groups;

communicate a capability of the RPV server to mirror the set of I/O groups in parallel by communicating a number of I/O groups that can be processed in parallel;

mirror the set of I/O groups from the asynchronous cache of the client server to the shadow physical volume and the emulated physical volume present on the RPV server using flags identifying each I/O group in the set of I/O groups;

receive a merge command specifying an order for merging each I/O group in the set of I/O groups;

merge the shadow physical volume and the emulated physical volume according to the order specified in the merge command; and delete the shadow physical volume to continue processing of the I/O groups on the emulated physical volume.

* * * * *